Feb. 28, 1928.
S. B. WINN
1,660,663
VERTICAL SUPPORT FOR SEMITRAILERS
Filed April 13, 1925
3 Sheets-Sheet 1
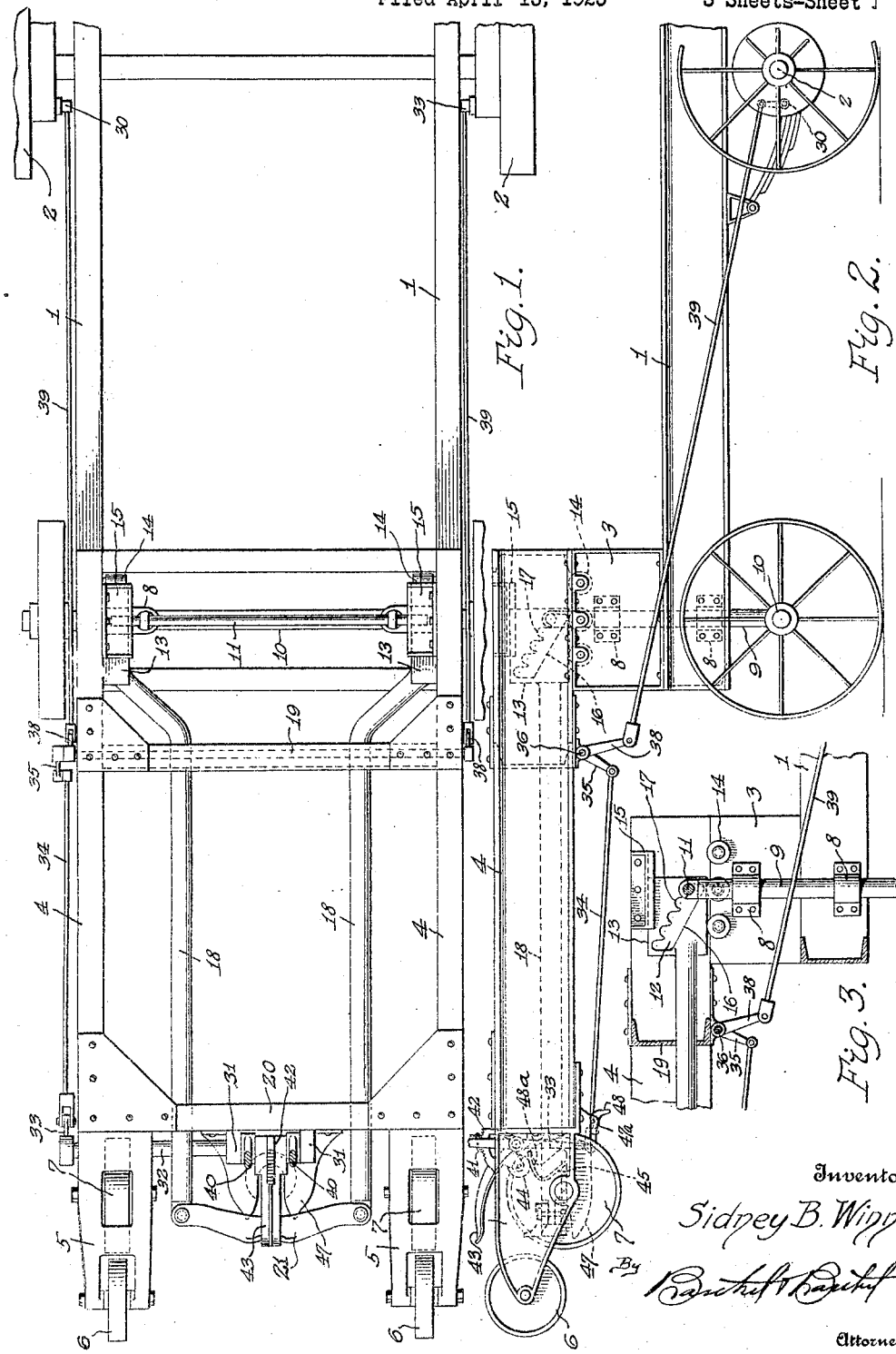
Inventor
Sidney B. Winn, Feb. 28, 1928.
S. B. WINN
1,660,663
VERTICAL SUPPORT FOR SEMITRAILERS
Filed April 13, 1925     3 Sheets-Sheet 2
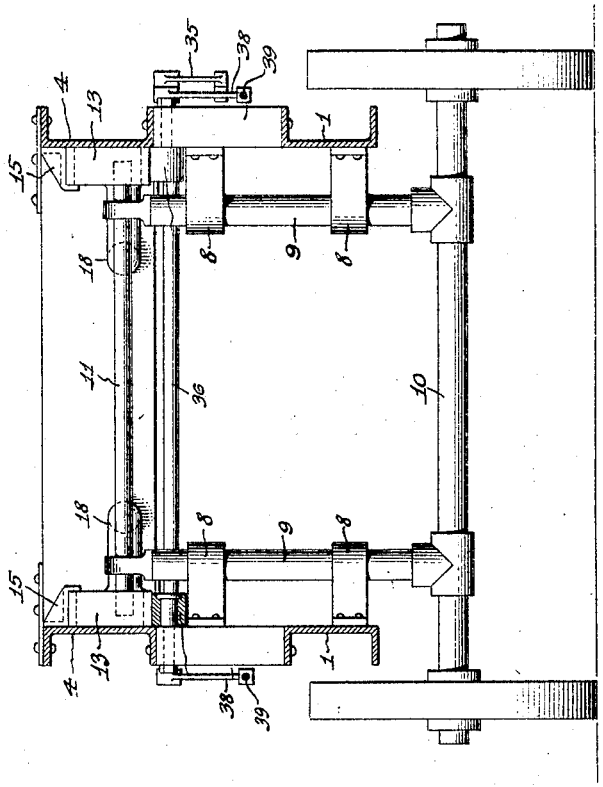
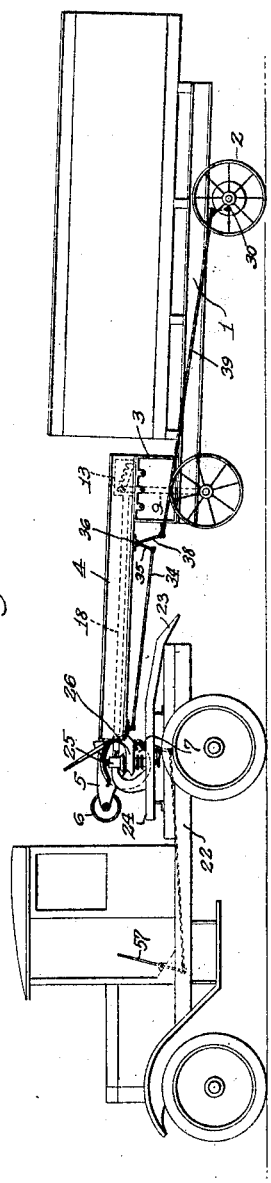
Inventor
Sidney B. Winn.
By
Attorneys

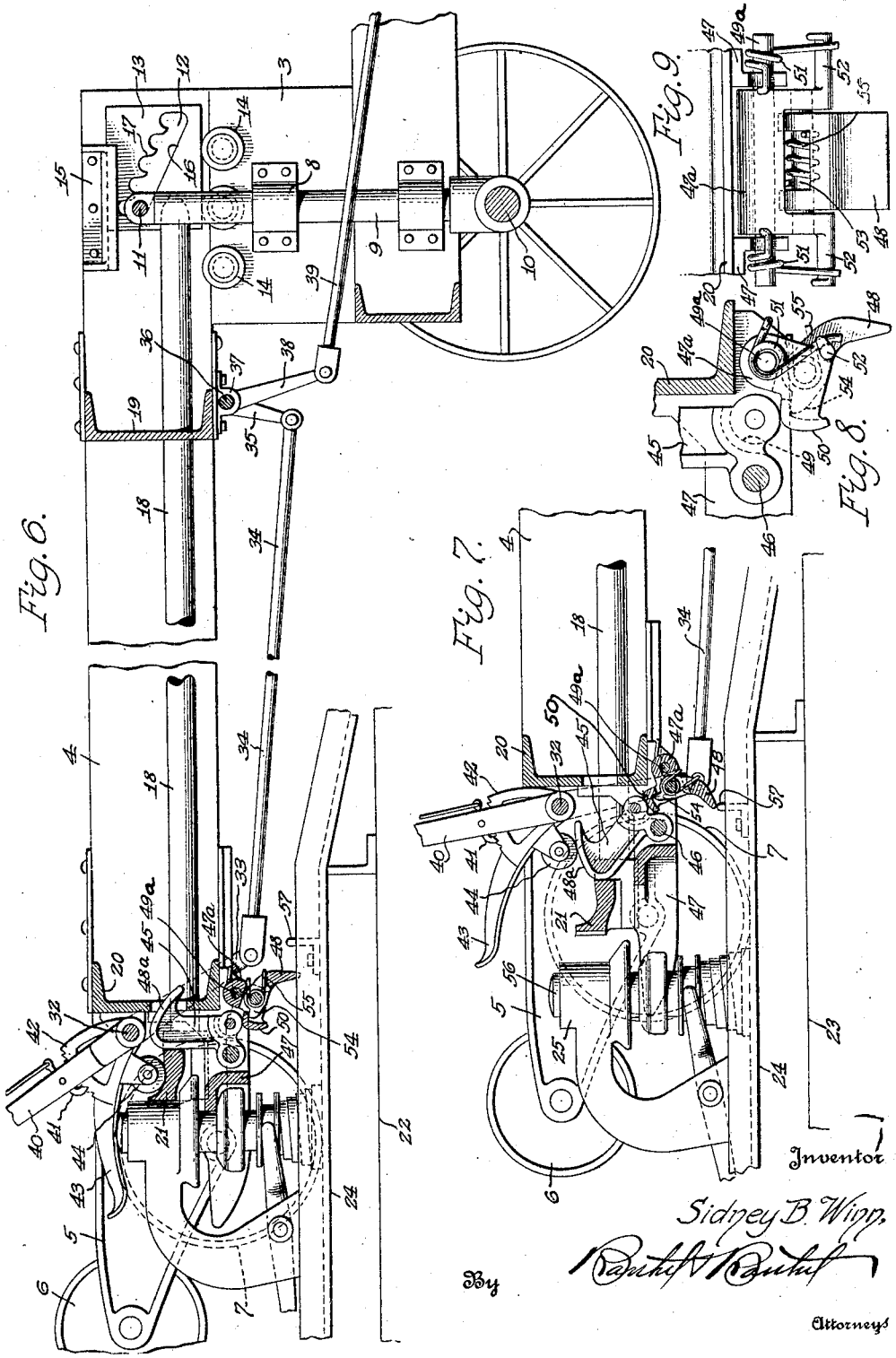

Patented Feb. 28, 1928.

1,660,663

UNITED STATES PATENT OFFICE.

SIDNEY B. WINN, OF LAPEER, MICHIGAN.

VERTICAL SUPPORT FOR SEMITRAILERS.

Application filed April 13, 1925. Serial No. 22,692.

This invention relates to a semi-trailer provided with a vertically shifting support or leg in contradistinction to that class of semi-trailers, having legs, supports, or other members, which are pivoted to swing in an arc, or arranged to bodily shift at an angle to the body or chassis of the semi-trailer.

My invention further relates to a tractor-trailer combination wherein the rear end of the tractor is adapted to be backed under the forward end of a trailer and coupled to the trailer to establish a service condition between the tractor and trailer. Such a trailer is ordinarily provided with a leg, or support, at or adjacent its forward end so that the trailer may be of service independent of the tractor, and it is in connection with the leg or support, that I have devised novel means for raising it as a coupled relation is established between the tractor and trailer, such relation maintaining the leg, or support, in an inactive position during tractor-trailer coupled service.

My improved leg, or support, is designed for vertical movement relative to the trailer chassis and on the forward end of the trailer chassis is a support actuating device operatable by a tractor for raising the trailer support and holding it in a raised position. The trailer support is adapted to descend, or assume an active position, by gravity, and when in an active position, the support actuating device locks the support against accidental movement incident to a load on the trailer. The locking of the support in an active position is automatic and unlocking is also automatically accomplished as the tractor is backed under the trailer, thus permitting the tractor to raise the support and hold it elevated during a tractor-trailer service.

My invention still further relates to a tractor trailer combination wherein the trailer has a movable support confined to vertical movement at a right angle to the direction of travel and adapted to be released to descend by gravity.

Figure 1 is a plan of a semi-trailer in accordance with this invention;

Fig. 2 is a side elevation of the same;

Fig. 3 is a vertical longitudinal sectional view of a portion of the trailer;

Fig. 4 is a cross sectional view of the trailer;

Fig. 5 is a side elevation, somewhat diagrammatic, of a tractor trailer combination with one of the trailer wheel brackets removed so as to show the coupling between the tractor and trailer;

Fig. 6 is an enlarged longitudinal sectional view of a portion of a tractor and a trailer coupled together;

Fig. 7 is a similar view showing relative positions of the tractor and trailer during uncoupling or disengagement and illustrating the manner in which movement is imparted to the trailer support and the trailer brakes set;

Fig. 8 is a detail sectional view of a pivoted tripping device forming part of the trailer equipment, and Fig. 9 is a front elevation of the same.

In the drawings, the reference numeral 1 denotes a trailer body or chassis having a rear axle assembly 2 including a brake mechanism 30 that may be manually controlled from the tractor. Mounted on the forward end of the trailer body or chassis are side supports 3 for an overhanging extension 4 provided with end and intermediate transverse brace members 19 and 20. The end member 20 of the extension 4 has forwardly extending brackets 5 for sets of wheels 6 and 7.

The trailer chassis and the supports 3, are provided with vertically alining guides 8 for the side legs 9 of a wheeled support 10 adapted to engage the ground and support the forward end of the trailer body so that it may be moved about similarly to any vehicle.

The upper ends of the support legs 9 are connected by a transverse member 11 and the ends of this transverse member extend into angularly disposed slots 12 of slide heads 13 supported between anti-frictional rollers 14 and guides 15. The rollers 14 are supported from the inner walls of the supports 3 and the guides 15 are supported from the inner walls of the trailer extension member 4. The slotted slide heads 13 afford inclined ways 16 so that said slide heads may have a wedging action between the rollers 14 and the ends of the transverse member 11. The upper walls of the slots 12 are notched or provided with seats 17 for the ends of the transverse member 11, and it is by virtue of said notches or seats that the trailer support may be automatically secured against vertical displacement under trailer load conditions.

The slide heads 13 are carried by forwardly extending arms 18 slidable through the transverse members 19 and 20 of the trailer extension member 4 and the forward ends of the arms are connected by a head 21.

On the transverse end member 20 of the trailer extension 4 are bearings 31 for a rock shaft 32 which has an end thereof provided with a crank 33 connected by a rod 34 to the crank 35 of a transverse rock shaft 36, said shaft being supported in bearings 37 carried by the trailer extension 4 and the transverse member 19 thereof. The rock shaft 36 has other cranks 38 connected by rods 39 to the brake mechanism 30 of the rear axle assembly.

On the rock shaft 32 is fixed a conventional form of hand lever 40 having a pawl 41 for engagement with a sector rack 42 loose on the rock shaft 32. The sector rack 42 has a forwardly extending shoe 43 and a depending anti-frictional roller 44. The roller 44 is adapted to normally engage the head 21 of the trailer support actuating means, so as to be within the path of a brake setting member 45 pivotally mounted on a pin 46 carried by a trailer coupling member 47 on the transverse end member 20 of the trailer extension 4. The brake setting member 45 includes a shoe portion 48$^a$ adapted to be swung forwardly under the roller 44 of the sector rack 42 when the brake setting member is tilted, and for this purpose said brake setting member has an anti-frictional roller 49 (see Fig. 8) for engagement by a tiltable member 47$^a$ provided with the trip member 48 adapted to be actuated by the tractor, as will hereinafter appear. The tiltable member 47$^a$ is supported under the transverse end member 20 by a pin 49$^a$ and said tiltable member includes a shoe portion 50 normally engaging the anti-frictional roller 49 of the brake setting member 45. This engagement is established by the expansive force of springs 51 arranged on the ends of the pins 49$^a$ for engagement with side extensions 52 of the tiltable member 47$^a$. This is best shown in Figs. 8 and 9 where it will be noted that the trip member 48 is pivotally mounted on a pin 53 carried by the tiltable member 47$^a$, said trip member having a lug 54 normally held in engagement with the inner face of the shoe 50 of the tiltable member 47$^a$ by the expansive force of a spring 55 arranged on the pin 53, said spring being weaker than the springs 51. As a result of this construction and arrangement of parts the trip member 48 may be actuated in one direction to tilt the member 47$^a$ and actuate the brake setting member 45, but when the trip member 48 is engaged and moved in an opposite direction, it moves independent of the tiltable member 47$^a$ and does not effect the actuation thereof. In some instances, the trip member 48 may be integral with the tiltable member 47$^a$, but I prefer to use the trip member as it is, so that the trailer brakes will not be released too soon. As shown in Fig. 7, the tiltable member 47$^a$ may hold the brake setting member 45 in engagement with the roller 44 of the trailer brake operating mechanism, thus retaining the trailer brakes set after the trip member 48 has been tripped and until such time that the cross head 21 restores the brake setting member 45 to normal position.

22 denotes a tractor having its rear end provided with a track 23, a turn-table or platform 24, and a tractor coupling member 25 adapted to cooperate with the trailer coupling member 47 in providing a tractor trailer coupling mechanism that may be controlled by the driver of the tractor. The tractor coupling member 25 includes a brake pin 56 adapted to be raised to actuate the shoe 43 of the brake sector rack 42 and during a coupled service relation of the tractor and trailer this may be accomplished by a brake lever 57$^a$ forming part of the tractor equipment. As the rear end of the tractor is backed under the forward end of the trailer, the inclined track 23 engages the set of wheels 6 for initial elevation of the extension member 4, so as to raise the slide heads 13, relative to the transverse member 11 and remove the ends of said transverse member from their slide head notches or seats 17.

As the tractor 22 is further backed under the extension member 4 the set of wheels 7 encounter the track 23 and roll up on to the platform 24 to accomplish final elevation of the extension member 4 relative to the tractor. As this tractor trailer engagement takes place the tractor coupling member 25 is brought into engagement with the cross head 21 and it is pushed rearwardly to shift the slide heads 13 and cause the inclined ways 16 of said slide heads to elevate the transverse member 11 and the trailer support 10, thus completely elevating the trailer support so that the forward end of the trailer is solely supported on the rear end of the tractor. As final elevation of the trailer support is accomplished, the coupling members 25 and 47 establish a coupled relation between the tractor and trailer, and the tractor coupling member 25 bearing against the cross head 21 retains the trailer support 10 elevated during combined service of the tractor and trailer.

On the platform 24 of the tractor is an actuating member 57 for engagement with the trip member 48, and when the rear end of the tractor is backed under the forward end of the trailer the actuating member 57 rides under the trip member 48 without having moved the tiltable member 47$^a$ or the brake setting member 45. The actuating member 57 comes into play when the tractor is to be disengaged from the trailer. Assuming that the tractor coupling member 25 has been actuated to permit of separation of the coupling members 25 and 47 and that the tractor moves away from the trailer, the actuating member 57 engages and tilts the trip member 48 causing it to actuate the tiltable member 47ª which in turn actuates the brake setting member 45. As this takes place the brake setting member 45 engaging the rear face of the cross head 21 pushes said cross head forward, thus shifting the slide heads 13 and giving a certain amount of freedom to the trailer support 10 should it be at all sluggish or slow in its descent. Displacement of the cross head 21 from under the roller 44 brings the shoe 48ª of the brake setting member 45 under said roller causing it to be elevated to impart movement to the sector rack 42 and since this rack is articulated with the hand brake lever 40 by the pawl 41 the shaft 32 will be rocked and by virtue of its connections with the brake mechanism 30 set the brakes of the trailer, thus preventing accidental movement of the trailer.

The arrangement of the brake setting member 45, tiltable member 47ª and trip member 48 is such that these members will be retained in the position shown in Fig. 2 during service of the trailer independent of the tractor, but even with these elements in such positions, the trailer brakes may be released by the hand lever 40 when it is desired to move the trailer about. During such independent trailer service the cross head 21 will be forward and free from the brake setting member 45, so that the cross head 21 will be in position for engagement by the tractor coupling member 25 when the cross head 21 is to be pushed rearwardly to elevate the trailer support. As this is accomplished, the cross head impinges against the brake setting member 48 and restores said member to normal position, as shown in Fig. 6, thus permitting the shoe 43 of the brake mechanism to assume a proper position relative to the brake pin 56, for actuation thereby when the trailer brakes are to be controlled by the driver of the tractor. It will be noted that the end member 20 of the trailer has an opening providing clearance for the shoe 48ª of the brake setting member 45.

When there is a coupled relation between the tractor and trailer, the slide heads 13 are supported on the anti-frictional rollers 14, and when the trailer is independent of the tractor, the brackets 15 bear on the slide heads 13 and transfer the load to the transverse member 11 and the trailer support 10. It is obvious that suitable anti-frictional devices may be used in connection with the slide heads 13, the brackets 15 or the ends of the transverse member 11. Any inequalities in the level of the ground will permit of the ends of the transverse member 11 seeking a set of notches or seats 17 which will prevent movement of the slide heads 13 under any trailer load condition.

From the foregoing, it will be observed that the trailer support 10 is confined to a vertical movement, said support descending by gravity and by such action pushing the slide heads 13 forward, so that the cross head 21 is in position for actuating by the tractor to raise the trailer support when the tractor and trailer are to be coupled together. The slide heads 13, arms 18 and cross head 21 constitute a support actuating member or means, operable by the tractor, for raising the trailer support, and in addition to the support actuating means there is the trailer brake setting means operatable when the tractor is disengaged from the trailer, independent of any brake setting means associated with the coupling member of the tractor.

I claim:

1. In a tractor-trailer combination wherein a tractor is adapted to have its rear end backed under the forward end of a trailer to support the forward end of the trailer, and wherein a coupling mechanism is adapted to establish a service relation between the tractor and trailer;—a support for the forward end of the trailer when detached from the tractor, said support being movable in a vertical plane relative to the trailer and means projecting from the forward end of the trailer and operatable by the tractor adapted for raising said support, said means including slide heads having notches engageable by said support to prevent movement of said means during service of said trailer when detached from said tractor.

2. The combination of a tractor, a trailer adapted to have its forward end raised by the tractor backing under the forward end of the trailer so that the forward end of the trailer may be supported on said tractor, an extension member constituting the forward end of said trailer, a vertically moving trailer support at the junction of said extension member with said trailer, and means in said extension member extending from the front end thereof to the rear end of said extension member adapted for raising said trailer support.

3. The combination called for in claim 2 wherein said means is operatable by said tractor backing under the forward end of the trailer, said means having a sliding connection with said support.

4. The combination called for in claim 2 wherein said trailer support includes a connecting member adapted for engagement with said means and said means has a series of notches to receive said connecting member to secure said support from slippage relative to said means.

5. A trailer comprising a body having rear wheels; an extension member on the forward end of said trailer body adapted for engagement with a tractor to raise the forward end of the trailer body relative to the ground, a wheeled support for the forward end of the trailer body, said support being slidable in a vertical plane relative to said trailer body, and means slidable longitudinally of said extension member controlling the vertical sliding movement of said support, said means being designed for engagement by a tractor and including heads having a wedge elevating action for said support.

6. A trailer comprising a body having rear wheels, a support for the forward end of said trailer body, said support having side legs slidable in a vertical direction only and adapted to descend by gravity, and a wedging slide head for each support leg adapted to cooperate in elevating said support and retaining it elevated.

7. A trailer as called for in claim 6 and means connecting said slide heads to cause a synchronous movement thereof.

8. A trailer as called for in claim 6 and means in connection with said slide heads and support legs to secure said support in a set load sustaining position.

9. A trailer comprising a body having rear wheels, an extension member at the forward end of said body and in a plane above said body, a support for the forward end of said trailer body, said support being held for vertical movement only and adapted to descend by gravity, heads slidable in the rear end of said extension member and constantly engaging said support to raise said support and control the descent thereof, and means at the forward end of said support adapted to be shifted to actuate said heads and raise said support.

10. In a tractor-trailer combination wherein a tractor is adapted to have its rear end backed under the forward end of a trailer to raise and support the forward end of the trailer, and wherein a coupling mechanism is adapted to establish a service relation between the tractor and trailer:—means including side legs adapted to support the forward end of the trailer when detached from the tractor, said legs being slidable in a plane at a constant angle to the longitudinal plane of the trailer, and wedging slide heads adapted to be actuated by the tractor to elevate said legs.

11. In a tractor-trailer combination wherein a tractor is adapted to have its rear end backed under the forward end of a trailer to raise and support the forward end of the trailer, and wherein a coupling mechanism is adapted to establish a service relation between the tractor and trailer, and wherein the trailer is provided with brakes, and the tractor with brake operating mechanism adapted to control the trailer brakes;—a support for the forward end of the trailer when detached from the tractor, said support being movable in a vertical plane relative to the trailer, support actuating means carried by said trailer and adapted to be operated by said tractor to raise said support relative to said trailer, and means associated with said support actuating means and adapted to set the trailer brakes during disengagement of the tractor from the trailer said supporting means being operative during disengagement of the tractor from the trailer to permit said support to descend by gravity.

12. A tractor trailer combination as called for in claim 11, wherein the last mentioned means includes a brake setting member extending into said support actuating means.

13. A tractor trailer combination as called for in claim 11, wherein the last mentioned means includes a brake setting member extending into said support actuating means, said brake setting member being operatable by said support actuating means when coupling the tractor to the trailer to release the trailer brakes.

14. A trailer having a brake mechanism, a vertically movable support for the forward end of the trailer; a tractor engageable with the trailer to establish a service relation, actuate the brake mechanism, and move the support, movement of the support by the tractor and trailer engagement causing the brakes to be released and tractor and trailer disengagement causing the brakes to be set.

15. In a tractor trailer combination wherein a tractor and brake equipped trailer are engageable and disengageable, and wherein a coupling device establishes a coupled service condition of the tractor and trailer, and wherein a support establishes a service condition of the trailer alone:— guiding means carried by said trailer confining the support thereof to upward vertical movement by engagement of the tractor with the trailer and downward vertical movement by disengagement of the tractor from the trailer, and support actuating means operatable by the tractor for effecting either movement of the support.

16. In a tractor trailer combination wherein a tractor and brake equipped trailer are engageable and disengageable, and wherein a coupling device establishes a coupled service condition of the tractor and trailer, and wherein a support establishes a service condition of the trailer alone:— guiding means carried by said trailer confining the support thereof to upward vertical movement by engagement of the tractor with the trailer and downward vertical movement by disengagement of the tractor from the trailer, and support actuating means controlled by the tractor for effecting either movement of the support, said support actuating means adapted by disengagement of the tractor to permit a downward vertical movement of the support and set the trailer brakes, and by engagement with the trailer cause upward vertical movement of the support and release the trailer brakes.

17. In a tractor-trailer combination wherein the rear end of a tractor is adapted to be backed under the forward end of a trailer, and wherein tractor and trailer coupling members are adapted to establish a combined tractor-trailer service relation, and wherein a shiftable support is adapted to assume an active position to support the forward end of the trailer for service independent of said tractor, and wherein said tractor-trailer combination includes a brake mechanism for the trailer:—means operative by withdrawal of the tractor from the trailer to cause actuation of the trailer brakes, said means including trailer support actuating means engageable with the tractor coupling member and releasable thereby to permit shifting of said support, a tiltable brake setting member carried by said trailer and engageable with said support actuating means to backward movement thereto, and means on said tractor adapted for actuating said tiltable brake setting member by disengagement of said tractor from said trailer to effect setting of the trailer brakes and permit said trailer support to assume an active position.

18. A tractor trailer combination as called for in claim 17, wherein said support actuating means includes a cross head which restores said tiltable brake setting member to normal position and releases the trailer brakes when the tractor is placed in engagement with the trailer.

19. A tractor trailer combination as called for in claim 18, and means associated with said tiltable brake setting members to effect activity of said brake setting member during disengagement of the tractor from the trailer and inactivity of said brake setting member during engagement of the tractor and trailer.

20. The combination of a trailer having brakes, a shiftable support for the trailer, a tractor engageable with said trailer and disengageable therefrom, a coupling mechanism for the tractor and trailer, means independent of said coupling mechanism set in action by disengagement of the tractor from the trailer to effect setting of the trailer brakes and downward movement of the trailer support, and means operative by engagement of the tractor and trailer to effect upward movement of the trailer support and release of the trailer brakes.

In testimony whereof I affix my signature.

SIDNEY B. WINN.